Patented Jan. 29, 1952

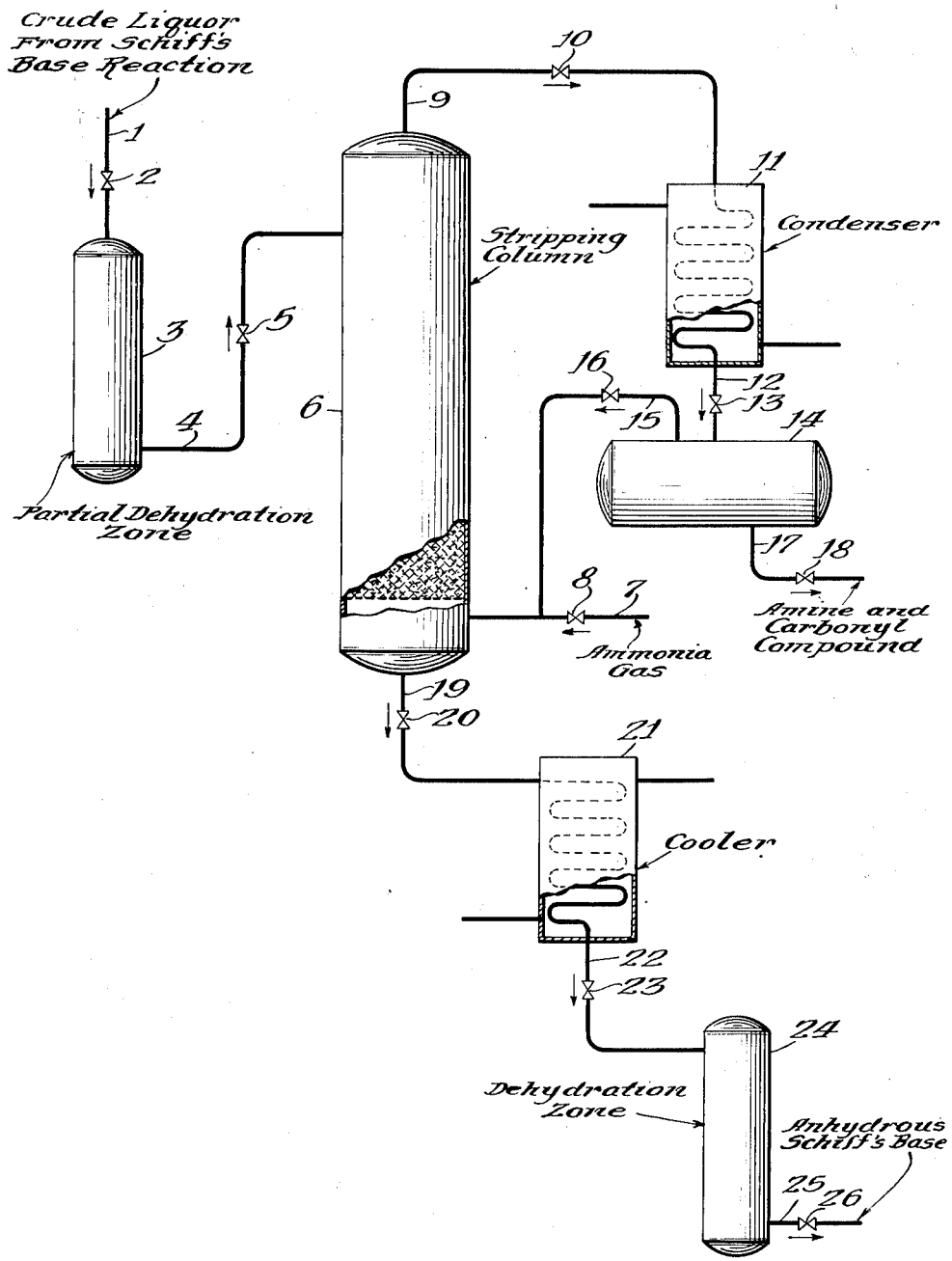

2,583,729

UNITED STATES PATENT OFFICE 2,583,729

SEPARATION OF A SCHIFF'S BASE FROM THE CONDENSATION PRODUCT OF A PRIMARY AMINE WITH A CARBONYL COMPOUND

Richard M. Deanesly, Hinsdale, Ill., assignor to Universal Oil Products Company, Chicago, Ill., a corporation of Delaware Application November 28, 1947, Serial No. 788,636

5 Claims. (Cl. 202—46)

This invention relates to a process for the separation of a Schiff's base product in a substantially anhydrous condition from the reactants utilized in its formation. More specifically, the invention concerns a method of preparing a substantially anhydrous Schiff's base product formed by condensing a carbonyl compound selected from the group consisting of aldehydes and ketones with a primary amine, forming the corresponding aldimine or ketimine comprising said Schiff's base, thereafter stripping from the reaction mixture the uncondensed primary amine and carbonyl compound present in the equilibrium mixture of the same with said Schiff's base utilizing therefor an ammonia-containing gas and dehydrating the residue from said stripping operation to remove water from the Schiff's base contained in said residue.

It has heretofore been known that aldimines and ketimines of the Schiff's base type may be prepared by the condensation of an aldehyde and/or a ketone with a primary amine, the formation of the product being represented by the structural equation:

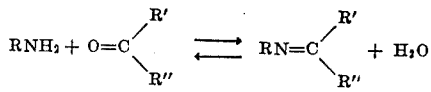

wherein R and R' are hydrocarbon radicals and R'' is a hydrogen atom or a hydrocarbon radical. In the preparation of a ketimine, for example, R'' represents a hydrocarbon radical such as an alkyl group, a phenyl, alkenyl, or cycloalkyl group which may be further substituted by other radicals which are non-reactive with amino and/or keto groups at the present operating conditions, such as halo, alkoxy, hydroxy, etc. groups. In the preparation of a Schiff's base aldimine R'' represents a hydrogen atom in the above equation. The condensation of the reactants is favored by the presence of certain catalysts, generally characterized as acid-acting catalysts, such as the halogen acids (for example, hydrochloric and hydrobromic acids), zinc chloride, phosphorus pentoxide, iodine, etc.

From the reaction mechanism as shown by the above equation, it is evident that the reaction mixture formed by the condensation of a primary amine with a carbonyl compound selected from the group consisting of the aldehydes and ketones contains the desired Schiff's base product in equilibrium with the primary reactants and water. It is also apparent that the presence of water therein tends to shift the equilibrium toward the left or towards the formation of the hydrolysate of the Schiff's base comprising the mixture of the primary amine and carbonyl compound originally charged to the condensation reaction. The hydrolysis of the Schiff's base, representing a shift in the equilibrium from the right to the left side of the above equation, is especially enhanced at high temperatures such that distillation of the reaction mixture at its normal boiling point increases the hydrolysis of a Schiff's base product and reduces the yield thereof from the reaction. The present invention has as its primary object providing a process for the removal of water and uncondensed primary amine and carbonyl reactant from the condensation reaction mixture by means of a stripping procedure whereby the uncondensed reactants are recovered under anhydrous or nearly anhydrous conditions such that hyrolysis of the Schiff's base product is minimized.

In one of its specific embodiments, the invention relates to a process for the production of a substantially anhydrous Schiff's base product which comprises reacting a primary amine with an equimolecular proportion of a carbonyl compound selected from the group consisting of the aldehydes and ketones at a condensation reaction temperature of from about 50° to about 250° C. and at a superatmospheric pressure of from about 1 atmosphere to about 100 atmospheres, effecting at least partial dehydration of the resulting reaction mixture and thereafter stripping uncondensed primary amine and carbonyl components comprising the initial reactants from said reaction mixture by passing the same at an elevated temperature corresponding to the boiling point of said mixture countercurrent to a stream of hot, gaseous, anhydrous ammonia in a stripping tower, separating a liquid bottoms fraction from said tower comprising said Schiff's base, and dehydrating said bottoms product by contacting the same with a solid, anhydrous, alkali, metal carbonate and separating the resulting dehydrated Schiff's base from said dehydrating agent.

The primary reactants herein specified which upon condensation yield the desired Schiff's base product are primary amines as one of the reactants and carbonyl compounds selected from the organic aldehydes and ketones as the other reactant. Primary amines as specified herein designate those compounds represented as the monoalkyl-substituted products of ammonia wherein a single hydrogen atom of ammonia is replaced by a hydrocarbon radical selected from the alkyl, alkenyl, cycloalkyl and aromatic radicals. Typical of the mono-alkyl primary amines are such compounds as methylamine, ethylamine, and homologs thereof, preferably containing fewer than about 10 carbon atoms per molecule. Of the alkenyl amines, typical representative compounds are butenyl amine, pentenyl amine, etc. Compounds comprised within the group of cyclic amines, that is, the cycloalkyl (naphthenyl) and aromatic amines are such compounds as cyclohexyl amine and aniline respectively. The carbonyl reactant specified herein may be an aldehyde or ketone and may be aliphatic, cycloalkyl, and/or aromatic of either saturated or unsaturated structure. Suitable ketones include such saturated members as acetone, methylethylketone, diethylketone, etc., cyclic saturated ketone such as methylcyclohexylketone, cyclic members wherein the carbonyl group is part of the ring, such as cyclohexanone, unsaturated ketones such as vinylmethylketone, ethylidene acetone, mesityl oxide, phorone, etc., polyketones such as acetophenone, butyrophenone, benzophenone, etc. and alkenylarylketones such as propenylphenylketone and homologs of the above classes, preferably containing fewer than about 10 carbon atoms per molecule. Typical aldehydes utilizable herein include such compounds as formaldehyde, acetaldehyde, crotonaldehyde, benzaldehyde and others. The aldehydes and ketones may further be employed in admixture with each other or with other members of the same group and the compounds may be substituted by other radicals which do not enter into the condensation reaction such as halo, alkoxy, hydroxy, nitro, etc. radicals.

The condensation reaction whereby the equilibrium reaction mixture represented by the above equation is formed may be effected by mixing, preferably, equimolecular proportions of the primary amine and carbonyl compound in the presence of a suitable catalyst such as the above indicated acid-acting inorganic compounds and reacting the same at a temperature of from about 50° to about 250° C. for a reaction period generally in excess of about ½ hour up to about 10 hours. The catalyst is generally present in the reaction mixture in an amount ranging from about 0.1 to about 10% by weight of the reactants and prior to the separation of the Schiff's base from the reaction mixture, the catalyst is preferably either neutralized or otherwise removed from the reaction mixture, as for example, by extraction.

The reaction product containing the equilibrium mixture of primary amine, Schiff's base, carbonyl compound and water is in accordance with the present process at least partially dehydrated by contacting the mixture with a suitable dehydrating agent which does not react or is otherwise incompatible with the products and reactants present in the equilibrium mixture. A typical class of dehydrating agents of this type are the anhydrous alkali metal or alkaline earth metal carbonates such as sodium and potassium carbonates which are contacted with the reaction mixture prior to the stripping stage of the process hereinafter specified. The amount of alkali metal carbonate required in the initial dehydration of the equilibrium reaction mixture is that amount sufficient to reduce the water content of the said mixture to about 1% by weight thereof. For this purpose, the amount of alkali metal carbonate introduced into the reaction mixture is generally from about 0.1 to about 10 weight proportions of said reaction mixture. The partially dehydrated reaction mixture comprising the liquid effluent from the above initial dehydration treatment may then be brought to a temperature above the boiling point either of the reactants or of equilibrium mixture at the particular ambient pressure and rapidly flashed into a stripping column such as a fractional distillation column containing a packing material preferably having a large total superficial area to enhance the release of vapors from the reaction mixture charged. Suitable packing materials include beryl saddles, quartz chips, etc. which are substantially inert to the reaction mixture charged to the column. The partially dehydrated condensation reaction mixture may be heated to the temperature specified above or it may be charged at a relatively cool temperature into a heated column wherein sufficient heat is absorbed from the packing material or from heating elements within the column to vaporize the primary reactants from the reaction mixture at the ambient pressure. Simultaneous with the introduction of the condensation reaction mixture into the stripping column, usually charged at a point intermediate between the vapor outlet and liquid bottoms product discharge line from the column, hot gaseous ammonia which may be admixed with an inert gaseous diluent such as nitrogen, hydrogen, carbon monoxide, etc. is injected into the bottom portion of the column to strip the vapors of primary amine and carbonyl compound released from the liquid reaction mixture and carry the same into the vapor outlet. A preferred method of operating the stripping column comprises introducing the partially dehydrated reaction mixture at a relatively cool temperature, such as room temperature, into the stripping column while hot anhydrous ammonia gas at a temperature of from about 50° to about 250° C. is charged into the column below the point at which the liquid bottom product is withdrawn from the column. The latter operation obviates the necessity of heating the equilibrium reaction mixture to relatively high temperatures for the purpose of vaporizing the primary reactants therefrom, at which temperatures the equilibrium is shifted toward the hydrolysis of the Schiff's base. The method also provides for introducing the necessary heat into the stripping column for vaporization of the uncondensed reactants. Further advantages of the latter method of operation is the maintenance of alkaline conditions within the stripping column, necessary for the release of free amine as stripping proceeds. The passage of ammonia gas countercurrent to the liquid reaction mixture and in intimate contact therewith furthermore provides an efficient means for stripping the reaction mixture.

It is desirable for proper operation of the process that at least the lower portion of the stripping column be designed and contain such packing material that a low liquid hold-up is prevalent during the stripping action. The operation of the stripping column as indicated provides certain advantages in that it permits rapid removal of the liquid phase containing residual water and the Schiff's base condensation product from the column, thereby reducing the hydrolysis of the Schiff's base to the primary reactants by reducing the period of time that the liquid phase containing the Schiff's base is maintained at the relatively high temperatures of the stripping column. The lower portion of the column may also be fitted with a reboiler to provide for the introduction of additional heat into the liquid fraction just prior to withdrawal of the latter fraction from the column, removing the last traces of amine and carbonyl compound reactants. Generally, however, the stripping action of the hot gaseous ammonia flowing countercurrent to the liquid phase therein is usually sufficient to remove substantially all of the uncondensed primary reactants therefrom. The ammonia-containing stripping gas is charged into the column at a rate sufficient to provide a vapor velocity therein of from about 0.1 to about 30 volumes of vapor per volume of free vapor spaced within the column per second. Depending upon the ratio of free vapor space per volume of packing material within the stripping column, which varies with the type of packing material utilized, it is necessary or at least preferred to maintain the gas velocity in the column less than that required for liquid entrainment in the vapor effluent.

The stripping column may be operated at pressures from subatmospheric to superatmospheric, although it is generally preferred to operate at atmospheric pressure or below to reduce the boiling point of the reaction mixture and consequently reduce the hydrolysis of the Schiff's base which is favored at higher temperatures. A preferred method of operation comprises introducing the liquid equilibrium reaction mixture at normal pressure into a stripping column maintained at a subatmospheric pressure, thus providing, in effect, a rapid flash distillation of the volatile components of the reaction mixture into vapors which are immediately removed from the column by the stripping action of the gaseous ammonia.

The sequence of operations provided in the present process is more particularly set forth in the following description of the accompanying diagram which illustrates merely one arrangement of apparatus for effecting the herein described process.

Referring to the accompanying diagram, the reaction mixture obtained on condensing a primary amine with a carbonyl compound and containing the product of the condensation herein referred to as a Schiff's base in equilibrium with water and uncondensed reactants is charged into the process flow through line 1 containing valve 2 into dehydration zone 3 wherein a portion of the water formed in the condensation reaction is removed by retention thereof on a suitable dehydrating agent contained in zone 3. Partial dehydration of the crude liquor from the Schiff's base reaction is effected in zone 3 by means of a dehydrating agent which is non-reactive with the Schiff's base product or the uncondensed reactants present in the reaction mixture. Suitable dehydrating agents may be selected from the anhydrous alkali and alkaline earth metal carbonates, preferably distributed in zone 3 in the form of discrete particles having a low liquid hold-up. Several zones may be provided connected in series or parallel flow to obtain the desired degree of dehydration. The partially dehydrated Schiff's base reaction mixture is withdrawn from zone 3 through line 4 in amounts controlled by valve 5 and is charged into stripping column 6 at a point between the vapor outlet and the liquid bottoms product discharge line of the column. The mixture may be heated prior to introducing the same into column 6, preferably to a temperature of about 10° or higher up to about 100° C. and at any desired pressure depending upon the method of operating stripping column 6.

Simultaneous with the introduction of the Schiff's base reaction mixture into column 6, gaseous ammonia heated to a temperature of from about 50° to about 250° C. is charged into the bottom of stripping column 6 through line 7 containing valve 8 to provide a countercurrent stripping operation in column 6 wherein the ammonia gas flows upwardly through the column and the liquid reaction mixture descends downwardly therethrough against the ammonia stripping gas. Column 6 is designed to obtain intimate contact between the ammonia stripping gas and the liquid Schiff's base reaction mixture and for this purpose it may contain a packing material distributed therein so as to provide for as low a liquid hold-up as possible. The hot anhydrous ammonia gas flowing countercurrent to the liquid Schiff's base reaction mixture is charged at a rate sufficient to maintain the temperature, alkalinity and stripping action at a desirable maximum, the ammonia gas carrying with it the vaporized primary amine and carbonyl compound originally present in the Schiff's base reaction mixture out of the column through vapor outlet line 9 containing valve 10 and is directed into condenser 11 wherein the primary amine and carbonyl compounds are liquefied by cooling. The liquid condensate formed in condenser 11 is withdrawn therefrom through line 12 and valve 13 and accumulated in receiver 14. The ammonia gas which accompanies the primary amine and carbonyl compound vapors into condenser 11 is not liquefied at the temperature at which the latter condenser operates (usually at from about 0° to about 20° C.) and exits therefrom through line 12 together with liquid condensate into receiver 14. It may be then directly recycled, for example by means of a compressor not shown on the diagram, into stripping column 6 through line 15, valve 16 and ammonia inlet line 7. The liquefied primary amine and carbonyl compound collected in receiver 14 may be withdrawn therefrom through line 17, valve 18 and diverted to auxiliary equipment not shown for separation of the mixture for recycling to the reactor wherein the Schiff's base condensation reaction is effected.

Since the Schiff's base product contained in the liquid bottoms product is readily subject to hydrolysis by the small amount of water contained in said bottoms product, especially at the temperatures maintained in stripping column 6, it is highly advantageous to cool said bottoms fraction from column 6 as rapidly as formed; therefore, it is conveyed without delay from column 6 through line 19 and valve 20 into cooler 21. A refrigerant is circulated through cooler 21 at a rate sufficient to reduce the temperature of the bottoms product liquid containing the Schiff's base to such value that hydrolysis of the mixture becomes negligible. The cooled liquor is removed from cooler 21 through line 22 and valve 23 to dehydration zone 24 where substantially all of the remaining water contained in the liquor is removed by retention thereof on a dehydrating agent contained in zone 24. The dehydrating agent may be of the same type or composition as that contained in zone 3, such as an alkali or alkaline earth metal carbonate. One of the preferred dehydrating agents is solid anhydrous potassium carbonate distributed in zone 4 to allow free flow of liquid therethrough. The substantially anhydrous Schiff's base product collecting in the bottom of zone 24 is removed therefrom through line 25 and valve 26 to storage or other points of utilization.

The ketimines and aldimines or Schiff's bases produced by the process of the present invention hereinabove set forth are useful for many purposes such as insecticides and as intermediates in the synthesis or other organic compounds. One of the outstanding uses of the product is its utilization as a starting material for the production of secondary amines by hydrogenation of the Schiff's base, usually in the presence of a suitable hydrogenation catalyst.

I claim as my invention:

1. A process for recovering a Schiff's base from the condensation reaction mixture of a primary amine and a carbonyl compound selected from the group consisting of the aldehydes and ketones without substantial hydrolysis of said Schiff's base in the presence of the water contained in said condensation reaction mixture which comprises contacting said condensation reaction mixture in liquid phase with a solid dehydrating agent selected from the group consisting of the anhydrous alkali and alkaline earth metal carbonates, thereby at least partially dehydrating said condensation reaction mixture, thereafter passing said partially dehydrated mixture in a liquid state countercurrent to anhydrous ammonia gas to strip uncondensed primary amine and carbonyl compound therefrom, and contacting the resulting liquid residue of the stripping operation with a dehydrating agent to remove substantially all of the remaining water from the residue comprising said Schiff's base.

2. A process for recovering a Schiff's base from the condensation reaction mixture of a primary amine and a carbonyl compound selected from the group consisting of the aldehydes and ketones without substantial hydrolysis of said Schiff's base in the presence of the water contained in said condensation reaction mixture which comprises contacting said condensation reaction mixture in liquid phase with a solid anhydrous alkali metal carbonate and thereby at least partially dehydrating said condensation reaction mixture, thereafter passing said partially dehydrated mixture in liquid state countercurrent to anhydrous ammonia gas charged at a temperature of from about 50° to about 250° C. and at a rate sufficient to strip substantially all of the uncondensed primary amine and carbonyl compound therefrom and contacting the resulting liquid residue of the stripping operation with a solid anhydrous alkali metal carbonate to remove substantially all of the remaining water therein from said Schiff's base.

3. The process of claim 1 further characterized in that said gaseous ammonia is diluted with an inert gaseous component prior to stripping said uncondensed primary amine and carbonyl compound from the condensation reaction mixture.

4. The process of claim 2 further characterized in that said alkali metal carbonate is solid anhydrous potassium carbonate.

5. The process of claim 1 further characterized in that the dehydrating agent employed in each of the dehydrating steps comprises an anhydrous alkali metal carbonate.

RICHARD M. DEANESLY.

REFERENCES CITED

The following references are of record in the file of this patent:

UNITED STATES PATENTS

| Number | Name | Date |
| --- | --- | --- |
| 1,350,254 | Frankforter | Aug. 17, 1920 |
| 1,466,435 | Hammond | Aug. 28, 1923 |
| 1,676,735 | Keyes | July 10, 1928 |
| 1,985,204 | Derr et al. | Dec. 18, 1934 |
| 2,084,419 | Wallis et al. | June 22, 1937 |
| 2,420,584 | Brimer | May 13, 1947 |
| 2,422,013 | Haury et al. | June 10, 1947 |
| 2,455,193 | Rohrmann | Nov. 30, 1948 |